2,902,359

METHOD OF RECOVERING DIFFICULTLY OXIDIZABLE METALS FROM ALLOYS, GRINDING DUST, ORES, MILL SCALE AND THE LIKE

Charles W. Schott, Pittsburgh, Pa., assignor to Crucible Steel Company of America, Pittsburgh, Pa., a corporation of New Jersey No Drawing. Application August 2, 1957
Serial No. 675,806

9 Claims. (Cl. 75—82)

This invention relates to the recovery of difficulty oxidizable metals such as nickel and cobalt from alloys and metal oxide bearing materials in a form in which they may be readily used. More particularly it relates to the recovery of nickel values from alloy steel grinding dust, and simultaneously from nickel oxide bearing ores, mill scale and the like. In another aspect it relates to a process for the separation and concentration of easily oxidizable elements such as chromium, manganese, aluminum, silicon and the like found in high alloy steels and mill scale and some ores from difficultly oxidizable metals also present, such as nickel and cobalt.

For many years considerable interest has been shown in the recovery of nickel from ores containing large quantities of iron oxide in addition to rather small amounts of nickel and other metal oxides, such as the laterites and serpentines, for example. Numerous pyrometallurgical methods for separating the nickel values from such sources have been published, but to the best of my knowledge all of these methods involve reduction. Unfortunately, even under so-called selective reducing conditions, most of the oxides present and available in the ores are reduced so that in the first step a product is obtained containing large percentages of iron, some manganese, carbon, cobalt, about 2 to 7% nickel, and generally double the nickel percentages of chromium. In the known selective reductions the oxides of silicon, magnesium, calcium and aluminum are not reduced and along with small quantities of other compounds form the slag of the process. In most of these smelting processes the slags present a serious problem since, because of their high melting point, circa 3100° F., they tend to attack and erode the refractory linings of the furnace, and are in general difficult to handle. The reductants usually employed in such processes are silicon, aluminum, carbon or carbon-bearing materials, which are added to the molten mass or mixed with the nickel bearing ores prior to heating. Use of the most economically attractive reducing agent, namely, coke, which material also serves as the fuel, in many instances results in an excessively high sulfur content in the recovered nickel alloy.

Following the so-called selective reduction, a second step is required in order to purify the nickel alloy, i.e., free it of chromium, manganese, silicon, sulfur and excess iron. This second step must be one of oxidation, and is usually carried out in a separate vessel with the addition of a relatively large supply of air and violent mixing such as would be acomplished in a Bessemer converter. In any event, proceeding by an initial reduction imposes a second, time-consuming step in a process of recovering nickel.

With these disadvantages of the known smelting processes by direct reduction, it is clear that a better source of nickel must be found, as well as a simpler method for its recovery. Attempts have been made to recover nickel where the same is present in metallic form along with other metals or metal oxides by quickly oxidizing the starting material in a converter so that the iron, chromium, etc. are effectively removed and the percentage of nickel contained is increased. However, a study of existing methods indicates that all are costly and most are entirely unsatisfactory, and the continued search by the steel industry for an economical method of nickel recovery attests to this fact.

An excellent source of nickel is the waste material existing throughout the steel industry in the form of grinding dust, roll and furnace scale, pickling vat sludge and turnings and chips from the machining and processing of nickel-containing steels. Such waste materials contain nickel, chromium, manganese and iron as well as other valuable elements in amounts substantially equivalent to the analysis of the parent metal from which they were generated. This is particularly true in the case of turnings and chips from machining operations as well as with grinding dust where the metal is essentially in a non-oxidized condition, the latter being diluted only by the abrasive employed. The quantity of mill scale generated will be readily apparent from the fact that when an ingot is heated it loses approximately 1.7% by weight to surface oxidation. Likewise, when the slab produced therefrom is heated, oxide scale losses amount again to approximately 1.7%. This oxide scale is removed between hot rolling, heat treating and the cold rolling operation, and has been discarded.

Losses to grinding dust amount to approximately 3% by weight of the slab, although this loss may at times approach 10% of the slab weight. Due to the fact that the grinding dust will usually contain between about 8 and 15% of the grinding abrasive, usually alumina, this material has been the subject of much concern in attempts to recover the metal values by melting due to the difficulty attending removal of the $Al_2O_3$ therefrom. It is apparent that the grindings and mill scale from such steels, which has heretofore for the most part been considered waste material, constitute a source of nickel superior to many nickel bearing ores.

In accordance with the present invention I have discovered a controlled oxidation process whereby difficultly oxidizable metals such as nickel and cobalt may be recovered in usable form from alloys containing the same together with other metals, and particularly from such alloy grindings without regard for the grinding wheel compound contained in the starting material. In accordance with the present process, the grinding dust containing the difficultly oxidizable metal in addition to chromium, manganese, silicon, aluminum, molybdenum, iron and other elements is combined with mill scale containing the oxides of such elements or with ores containing the oxides of these metals, for example, the laterites and serpentines, and the mixture charged to a furnace and heated up to the liquid state without the addition of a reductant. The mill scale or ore or a combination of these latter two materials supply the oxygen required for oxidation of the other metals in the grinding dust or other metallic waste material, and as the charge is heated, oxidation begins. Due to the exothermic nature of the reaction, the heat requirements of the present process are significantly less than in the selective reductions mentioned. Practically all of the readily oxidizable chromium, manganese, silicon, aluminum, etc. as well as some of the iron are oxidized. The less readily oxidizable elements, nickel, for example, combine with the remaining iron to form an alloy containing about 85–92% Fe. Iron being the major constituent of the waste material, in the absence of air it will not be oxidized completely by virtue of its volume and the time given to the process. The concentration of nickel or cobalt or both as the case may be in the iron alloy formed is controlled by the time of processing and the amount of oxides initially charged.

If nickel oxide is present in the charge, as it will be when using either roll scale from nickel-bearing steels or nickel-bearing ores or combinations thereof the nickel oxide acts as an oxygen supplier for the higher activity metals, and as the oxygen transfer takes place, the nickel (or cobalt as the case may be) is liberated to the remaining unoxidized metal. The process is termed a "controlled oxidation" for the reason that the primary source of oxygen for the oxidation of chromium, manganese, silicon, iron and the other easily oxidizable metals present in the grinding dust is derived from the ore or mill scale or other waste material. It is not believed that mill scale has ever been used in a similar process heretofore. This material, while primarily $Fe_3O_4$, contains sufficient additional oxygen, perhaps in other unstable forms, to oxidize the chromium, manganese, other minor elements, and a portion of the iron contained in the grinding dust. With this controlled oxidation, as distinguished from thermal reductions employed heretofore as a means for recovering the nickel, no secondary oxidation is required in order to separate the metals which are initially reduced along with the nickel in the conventional reduction operation.

The process is carried out in an electric arc or an open hearth furnace although other furnaces, such as the electric shaft type or kiln type may also be employed, at normal steel making temperatures, that is between about 2400° and 3000° F. and preferably at about 2800° F. The melting point of the nickel-iron alloy product, containing about 0.03% C., will be about 2700–2800° F.

Referring now to the process in more detail it will be recalled that the source of metallic nickel is the grinding dust, turnings and chips from the machining of nickel steels and particularly Type 300 stainless, typical analysis of which is as follows:

| | |
|---|---|
| Carbon | 0.15 |
| Manganese | 2.0 |
| Phosphorus | 0.045 |
| Sulfur | 0.03 |
| Silicon | 1.0 |
| Nickel | 8.0 |
| Chromium | 18.0 |
| Iron | Balance |

In the case of grinding dust these values will of course be reduced because of the $Al_2O_3$ or other grinding wheel abrasive and bonding materials which it contains. $Al_2O_3$ analyzes between about 8 and 15% of the grinding dust. As diluted the dust contains about 4.5–6.5% Ni and about 12–16% Cr.

It will also be recalled that the source of oxygen in the process is found in the oxide ores such as the serpentines and laterites and also in the roll and furnace scale, referred to herein as mill scale. In the case of the above stainless steel the mill scale contains substantially the same analysis as the metal from which it is produced, but the above analysis is reduced percentage-wise because of the oxygen picked up by the elements and also because of a refractory material which comes from the heating furnace and the ingot mold hot tops.

In mills rolling low alloy and carbon steels as well as high alloy stainless steels, the grindings and mill scale, unless segregated will not contain the high nickel content shown above. However, the scale from a typical steel mill processing approximately 25% Type 300, approximately 10% Type 400 and about 65% carbon and lower alloy steels over a period of a month, contained between about 0.75 and about 2.5% nickel. In a mill producing in the aforementioned ratios of stainless and high alloy to carbon and low alloy steels, the overall average nickel content of all mill scale and grinding dust combined was found to be between about 2½ and 3% by weight. This of course is equivalent to a good grade of nickel-bearing ore, which is available at the scene of operations, where mining, transportation and drying costs are not encountered. It is evident that the use of waste such as the steel grindings as a source of nickel in combination with scale or nickel-bearing ores offers many advantages over the use of ore alone.

Laterite and serpentine ores which may be used in conjunction with the mill scale or as a substitute therefor have the following typical analysis:

| | Percent |
|---|---|
| Ni | 0.75–1.5 |
| Cr | 2.0–3.0 |
| Mn | 0.1–0.5 |
| Fe | 25–60 |
| $SiO_2$ | 4–8 |
| $Al_2O_3$ | 8–16 |
| CaO | 0.2–1.0 |
| MgO | 0.75–2 | with the iron content nearer the lower figure for the serpentines and the higher figure for the laterites.

In carrying out the process predetermined amounts of grinding dust and roll scale or ore or mixtures of roll scale and ore are premixed prior to heating. Since the source of oxygen is the scale or ore, the degree of oxidation obtained will depend primarily upon the ratio of the oxygen bearing material to grindings in the charge. Approximately equal weights of grindings and the metal oxide bearing material have proved successful, although excellent nickel recoveries have been obtained over a wide range of scale or ore to grinding dust ratios, as shown hereinafter. Lime in amounts between about 1 and 3% by weight may also be added to the charge in order to scavenge sulfur which may be present. Also in some instances a small quantity of coke, usually not more than 1–2% by weight of the charge may be added in order to better control the oxidation reaction. However, the coke in small amounts is employed only as a control measure, and is not required in the process. Large additions of carbon or coke tend to prolong the oxidation, increase costs and dilute the nickel alloy, it being recalled that the present method does not require a reductant as such.

The furnace into which the mixture is charged either cold or preheated is preferably lined with chrome ore, Magnesite or other suitable material. A portion of the mixture is charged onto the furnace bottom and forms a pool of molten material to which the balance of the charge is fed by regulated continuous or intermittent additions. Upon melting, the mill scale or ore forms a fluid slag which tends to surround the metallic particles and permits rapid transfer of oxygen to the metal even though the metal may not yet have reached its melting point. The molten metal which collects on the bottom of the furnace under a blanket of slag consists of an iron-nickel alloy containing from about 8 to 15% and generally between about 10 and 12% nickel. Experimental meltings indicate that the oxidizing slag melts prior to the metal, therefore the metal particles tend to descend slowly through the forming oxidizing slag until they collect in a pool below the slag level. During the descent of metal particles, the transfer of oxygen from nickel oxide, present in the ore or mill scale, to the metals chromium, manganese, silicon and other elements proceeds rapidly under the controlled conditions of the process. Thus the nickel contained in the ore or mill scale is recovered simultaneously to the concentrating of nickel contained in the grinding dust and other waste.

Inasmuch as the metal in the charge is subject to oxidizing conditions from the moment of heating, the volume of metal throughout the charge becomes progressively less. The nickel is not oxidized and its concentration builds up in the molten metal, thus reducing the melting point of the nickel-iron alloy. At the same time the products of oxidation, especially iron oxide, build up in the slag. Its increasing iron oxide concentration lowers the melting point of the slag. The quantity of this material in the slag may of course be controlled by the ratio of ore or scale to grindings in the charge. The composition of the nickel-iron alloy product is regulated by the duration of heating under a given set of oxidizing conditions, with prolonged heating resulting in an alloy product of higher nickel content.

The recovered nickel-iron alloy is used in general steel making, while the slag from the process may be used in steel making processes where the composition is found to be suitable. In this connection the oxides of chromium, manganese, silicon and the other metals which are concentrated in the slag may be further concentrated if desired and added to the charge of a regular production heat of steel. These oxides may then be reduced and their metals recovered during the working of the heat without making any abnormal changes in the normal practice of making steel. A series of nine heats were melted in an indirect arc furnace of 15 lb. capacity, with various ratios of grindings to mill scale, with and without coke and lime additions. The grindings and scale were obtained from a mill processing stainless as well as low alloy and carbon steels. The composite grindings contained between about 4 and 6.5% nickel, and the scale about 2% Ni as NiO. Five of the heats were melted in a rammed, bonded chrome ore lining and four in a rammed Magnesite furnace lining.

Table I below reports the weight of grindings and scale, as well as the weight of lime and coke, if any, for each of the heats. The analysis of the resulting nickel-iron alloy product and the slag in each instance is reported in Table II.

Magnesite furnace lining. The nickel-iron alloy produced from these tests contained between 9.11 and 11.29% nickel, with only traces of chromium and manganese. Heat No. 5 is an exception showing 0.82% chromium in the metal and abnormally high amounts of $Al_2O_3$, $SiO_2$ and Cr in the slag, and the sulfur was relatively high in the metal at 0.171%. These abnormalities reflect the high ratio of grinding dust to mill scale in the charge and the 1% lime addition was clearly insufficient to hold the chromium and sulfur in the slag. Sulfur content of the alloys ranged from 0.063 to 0.23 with an average of 0.155% for the nine melts. Although this may apepar high, it has been found that the sulfur content may be lowered through the use of additional lime in the charge, or it can be removed in the flush off slag when the alloy product is used in steel production. In each of the experimental heats it is noted that the nickel-iron alloy product contained well above 90% of the nickel charged to the furnace.

In large scale arc furnace operations, the same charging and feeding techniques which have already been discussed are followed. A long arc is maintained above the slag and the charge material is fed in close proximity to the heating zone around and below th electrodes while controlling the temperature at about 2800° F. Because of the favorable fluidity of the slag of the present process, the same will be accumulated in the furnace until its capacity becomes overloaded. At this point the slag is flushed off without loss of metal. The nickel-iron alloy is tapped as desired by the operator, with the metal being paddled and then sampled in the same manner used in normal steel melting.

Two additional heats were melted with the same grinding dust but with Cuban laterite ore replacing the mill scale. The ore had the following analysis:

| | Percent |
|---|---|
| Ni | 0.94 |
| Cr | 2.01 |
| Mn | 0.01 |
| Fe | 53.54 |
| $SiO_2$ | 6.19 |
| $Al_2O_3$ | 12.93 |
| CaO | 0.29 |
| MgO | 0.88 |

The heats were of approximately the same size as those described above, and contained approximately equal

*Table I*

| Heat No. | Weight in Pounds | | | |
|---|---|---|---|---|
| | Grinding Dust | Roll Scale | Coke | Lime |
| 1 | 5 | 5 | | |
| 2 | 5 | 5 | | 0.2 |
| 3 | 2.5 | 7.2 | 0.2 | 0.1 |
| 4 | 5 | 4.9 | | 0.1 |
| 5 | 7.5 | 2.4 | | 0.1 |
| 6 | 5 | 5 | | 0.1 |
| 7 | 5 | 5 | 0.2 | 0.1 |
| 8 | 5 | 5 | 0.2 | 0.3 |
| 9 | 7.5 | 2.5 | 0.2 | 0.3 |

*Table II*

| Heat No. | Metal wt., # | Metal analysis (percent) Balance: Fe | | | | Slag wt., # | Slag analysis (percent) | | | | | | | |
|---|---|---|---|---|---|---|---|---|---|---|---|---|---|---|
| | | Ni | S | Cr | Mn | | Ni | Cr | S | FeO | CaO | $Al_2O_3$ | MnO | $SiO_2$ |
| 1 | 2.5 | 11.26 | 0.093 | 0.019 | 0.018 | 6.2 | 0.263 | 11.55 | 0.071 | 44.61 | 2.11 | 23.80 | 1.45 | 4.64 |
| 2 | 1.2 | 10.34 | .081 | .019 | .005 | 5.5 | .227 | 11.75 | .113 | 55.49 | 5.50 | 12.97 | 1.20 | 4.10 |
| 3 | 3.8 | 9.11 | .063 | .018 | .006 | 6.2 | .106 | 8.70 | .123 | 66.28 | 2.58 | 8.55 | 0.95 | 5.93 |
| 4 | 2.9 | 10.16 | .098 | .024 | .028 | 6.0 | .262 | 11.01 | .089 | 54.27 | 1.76 | 14.90 | 1.78 | 6.72 |
| 5 | 3.3 | 9.13 | .171 | .82 | .020 | 5.1 | .197 | 18.16 | .035 | 32.44 | 1.59 | 27.26 | 2.39 | 8.09 |
| 6 | 2.0 | 11.29 | 0.20 | Trace | .007 | 2.2 | .18 | 17.56 | .325 | 38.05 | .80 | 9.02 | 1.83 | 2.40 |
| 7 | 3.4 | 9.46 | 0.23 | Trace | .014 | 4.4 | .10 | 14.79 | .185 | 23.70 | .40 | 18.37 | 1.91 | 3.34 |
| 8 | 3.9 | 9.19 | 0.23 | Trace | .012 | 3.2 | .05 | 17.00 | .225 | 25.85 | 2.83 | 12.93 | 1.98 | 3.40 |
| 9 | 3.8 | 9.24 | 0.23 | Trace | .042 | 3.1 | .10 | 16.35 | .230 | 26.20 | 2.70 | 13.00 | 2.08 | 3.60 |

The high iron oxide content of the slag, ranging between 23.7 and 66.28% Fe, resulted in substantial lowering of the slag melting point and it was found that the slag had no damaging effect on either the chrome ore or weights of grinding dust and ore. No carbon was added to the charge of either heat but 10% lime was tried. The nickel-iron alloy product and the slag so formed had the following analysis:

*Table III*

| Heat No. | Metal wt., # | Ni | S | Cr | Mn | Si | Cu | Slag wt., # | Slag analysis (percent) | | | | | | | |
|---|---|---|---|---|---|---|---|---|---|---|---|---|---|---|---|---|
| | | | | | | | | | Ni | Cr | S | FeO | CaO | $Al_2O_3$ | MnO | $SiO_2$ | MgO |
| 10 | 2.8 | 9.68 | 0.08 | 0.88 | 0.009 | 0.01 | 0.26 | 3.1 | 0.15 | 16.35 | 0.088 | 33.14 | 13.64 | 19.59 | 1.84 | 5.03 | 1.98 |
| 11 | 3.0 | 12.09 | 0.075 | 0.88 | 0.009 | 0.015 | 0.20 | 3.2 | .11 | 11.35 | .102 | 44.31 | 13.88 | 16.83 | 1.81 | 5.66 | 1.70 |

In the preceding Tables II and III carbon content of the metal product is not shown. Analysis for this element in several of the heats showed values below .04% carbon thus indicating a very low carbon-nickel-iron alloy which is most economically desirable for production use. Such a low carbon-nickel-iron alloy is to be preferred over the products of reduction processes containing as much as 1.0% carbon because in normal production heats of stainless steel and many types of open hearth steels the carbon must be "worked out" at additional cost of time and material. Thus it can be seen that the same excellent nickel recoveries are obtained with ore as with mill scale as the metal oxide bearing material.

While the present process is based in part upon the use of a solid metal oxide bearing material as the source of oxygen for the oxidation of the easily oxidizable metals present, some consideration has been given to the injection of controlled amounts of air or oxygen into the molten metal in the furnace to speed up oxidation of chromium, manganese, iron, etc. after the nickel has been absorbed. However, such modifications would be but improvements on my basic idea wherein the oxygen necessary is derived from a metal oxide bearing material.

It is noted that the present invention has in the main been describeed as it relates to the recovery of nickel values from stainless steel waste. This has been done for purposes of simplicity, and it is to be understood that other difficulty oxidizable metals such as cobalt and tungsten can also be recovered in a similar manner. Likewise, the recovery of difficulty oxidizable metals in usable form from alloys also containing metals which are more easily oxidized is not limited to iron containing alloys and iron oxide systems, it being necessary only that the metal oxide bearing material employed contain one or more metal oxides capable of being reduced by the more easily oxidizable metal.

What is claimed is:

1. A process for recovering difficultly oxidizable metal selected from the group consisting of cobalt and nickel in usable form from more easily oxidizable metals which comprises, mixing waste products selected from the group consisting of grinding dust and machine turnings and chips of alloy steels containing said metal with a metal oxide bearing material containing mill scale from said alloy steels, heating said mixture to steel making temperatures until the mixture becomes molten and the easily oxidizable metals are oxidized and pass into the slag leaving a molten alloy of said metal and iron therebeneath, and drawing off said molten alloy.

2. A process for recovering difficultly oxidizable metal selected from the group consisting of cobalt and nickel in usable form from more easily oxidizable metals which comprises, mixing waste products selected from the group consisting of grinding dust and machine turnings and chips of alloy steels containing said metal with a metal oxide bearing material containing iron oxide and an oxide of said difficultly oxidizable metal, heating said mixture to steel making temperatures until the mixture becomes molten and the easily oxidizable metals of said steel are oxidized and pass into the slag leaving a molten alloy of said metal and iron therebeneath, and drawing off said molten alloy.

3. A process for recovering difficultly oxidizable metal selected from the group consisting of cobalt and nickel in usable form from more easily oxidizable metals which comprises, mixing waste products selected from the group consisting of grinding dust and machine turnings and chips of alloy steels containing said metal with a metal oxide bearing material comprising a mixture of mill scale from said alloy steels and a naturally occurring metal oxide comprising iron oxide and said difficultly reducible metal oxide, heating said mixture to steel making temperatures until the mixture becomes molten and the easily oxidizable metals of said steel are oxidized and pass into the slag leaving a molten alloy of said metal and iron therebeneath, and drawing off said molten alloy.

4. A process as set forth in claim 1 wherein said metal oxide bearing material is selected from the group consisting of laterite and serpentine ores.

5. A process for recovering nickel from nickel bearing steel waste products selected from the group consisting of grinding dust and machine turnings and chips which comprises mixing said waste products with a metal oxide bearing material containing nickel oxide, heating said mixture to between about 2400° and 3000° F. whereby the mixture becomes molten and the metals present which are more easily oxidizable than nickel are oxidized and pass into the slag leaving a molten nickel-iron alloy therebeneath, and drawing off said molten alloy, substantially all of the oxygen required for oxidation being supplied by said metal oxide bearing material.

6. A process as set forth in claim 5 wherein said metal oxide bearing material comprises mill scale of said nickel bearing steel.

7. A process as set forth in claim 5 wherein said metal oxide bearing material comprises an ore containing the oxides of iron and nickel.

8. A process as set forth in claim 5 wherein said mixture contains metal oxide bearing material in amount sufficient to provide the oxygen necessary and in a form available for oxidation of substantially all of the metals present in said steel with the exception of all of the iron present.

9. A process as set forth in claim 5 wherein sufficient lime is present in said mixture to scavenge a portion of the sulfur present in the mixture from the nickel-iron alloy being produced.

References Cited in the file of this patent

UNITED STATES PATENTS

| | | |
|---|---|---|
| 2,274,946 | Vogel-Jorgensen | Mar. 3, 1942 |
| 2,558,104 | Scharschu | June 26, 1951 |

FOREIGN PATENTS

| | | |
|---|---|---|
| 432,439 | Great Britain | July 26, 1935 |